Inventors:
Ernest A. Ferris and
Harold A. Heinrich
By: Richard J. Myers Atty

United States Patent Office 3,301,504
Patented Jan. 31, 1967

3,301,504
SEAT BELT RETRACTOR
Ernest A. Ferris, Elmhurst, and Harold A. Heinrich, Bellwood, Ill., assignors to Borg-Warner Corporation, Chicago, Ill., a corporation of Illinois
Filed May 4, 1964, Ser. No. 364,664
3 Claims. (Cl. 242—107.11)

This invention relates to seat belt retractors and in particular to a seat belt retractor being provided with means for controlling the loading of the retractor energy storing means.

In a seat belt retractor employing an internal energy storing means in the form of a spring means it is found that the spring means of the retractor may become overwound and that retractor device is thereby permanently damaged.

It is therefore a general object of this invention to provide a seat belt retractor having an energy storing means including means that may be in the form of a winding spring means whereby the energy storing means is provided with a limit or protective stop in aid of preventing the overloading of the spring means.

It is another object of this invention to provide for a safety seat belt retractor of type having a reel and a reaction member for winding an internal spring means in pre-loading the retractor prior to placing on the seat belt wherein there is provided a pre-wind stop or limit in the form of a sleeve means to avoid deleterious engagement of the spring means with the other parts of the retractor in preventing damage to the retractor.

It is another object of this invention to provide for a safety seat belt retractor having a spring means within a tubular reel connected by the reel and a reaction member whereby said spring is disposed about a mandrel means in the reel for support of the spring, means in the form of a sleeve to prevent the spring from engaging with the axially extending peripheral portions of the mandrel means.

It is still another object of this invention to provide for a seat belt retractor device having a tubular reel containing a coiled spring supported by separable mandrel portions in the reel and a reaction member for winding of the spring by rotation of the reel relative to the reaction member, sleeve means interposed between the spring and the separable mandrel means to prevent the spring from going in between the mandrel means and to tightly grip the mandrel portions to prevent axial movement of the mandrel means upon tight winding of the spring about the separable mandrel means.

Another object of this invention is to provide a split sleeve for a seat belt retractor device of the type aforesaid whereby the split sleeve reduces in diameter and tightly grips the mandrel portions upon tight winding of the spring about the sleeve and prevents axial separation of the mandrel portions from one another.

These and other objects will become apparent from a reference to the following description and appended drawing wherein.

Figure 1:
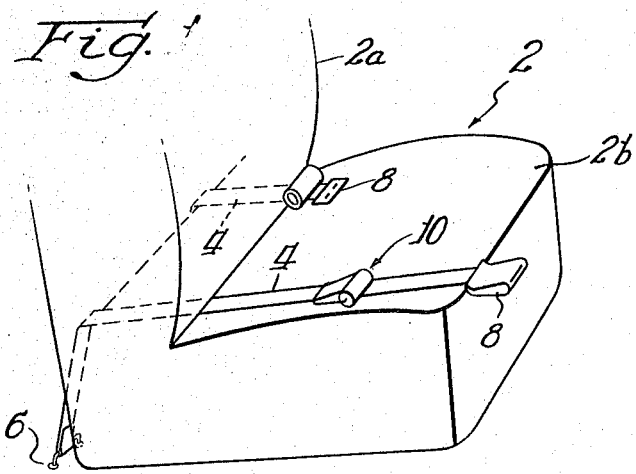
FIGURE 1 is a perspective view of the seat belt and retractor therefor mounted on a vehicle seat.

With reference now to the drawing there is shown a vehicle seat structure 2 having a back rest 2a and a seat 2b. A pair of seat belt portions 4, 4 lay on seat 2b and between the junction of parts 2a and 2b, each belt portion having a rear floor anchor 6 and a forward couple 8 and a retractor unit 10 thereon, the right belt length 4 being extended and the left belt length 4 being retracted by the retractor unit 10.

The safety seat belt rotary retractor unit 10 is of the roll-up type described in co-pending U.S. patent application, Serial No. 335,028, filed January 2, 1964, now Patent Number 3,230,009, whereby the belt length 4 is rolled or reeled around the barrel or hollow reel 12 of the unit 10 and has its flat side 14 engaged by transverse arm part 16 of hinge or reaction member 18. The reaction member or lever 18 has a pair of arm parts 20, 22 extending lengthwise of the belt length 4 and connecting with the transverse arm part 16. The arm 20 has an end leg 23 rotatively journalled in the outer end of hub 24 of closure or end anchor plug 26 that is attached to the end 28 of the barrel or tube 12 and constrained for rotation with the barrel 12. The plug 26 acts as a closure for the end of the barrel 12 and has a shaft or mandrel part 30 having an open end slot 32 receiving end 34 of an elongated helical coil reaction spring 36 having spiral portion 38. The spring 36 has its other end 40 in an open end slot 42 of mandrel or shaft part 44 of end driver plug 46 rotatively journalled in end 48 of the barrel 12. The mandrel part 30 has an extension or stub 30a releaseably received in bore 44a of mandrel part 44. The hub 50 of the end driver plug 46 has a fixed connection with end leg 52 of arm part 22 of the reaction member 18 and also acts as a closure for the other end 48 of the barrel 12. The spring spiral portion 38 is disposed about the shaft portions 30, 44 and seats against the hubs 24, 52 of the plugs 26, 46. Belt clamp means 54 in the form of arms 56, 56 are mounted on the periphery of the barrel and extend toward one another to hold the belt length to the barrel 12.

The shaft or mandrel parts 30 and 44 extending through the spiral portion 38 of the spring 36 maintain the spiral portion 38 in axial alignment and prevent it from bending or kinking. The hubs 24 and 50 being held in the tube 12 against axial movement by the arms 20, 22 of the reaction member 18, supportingly hold the spring 36 in compression in the tube or reel 12, the ends 38a and 38b of the coil portion 38 of the spring 12 engaging the inwardly directed radial surfaces 24a and 50a of the hub parts 24 and 50.

Figure 5:
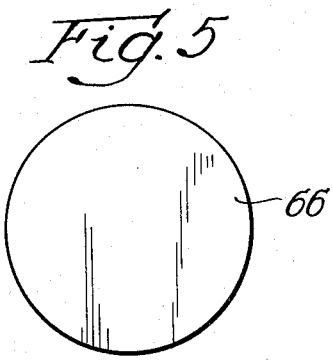
FIGURE 5 is an unfolded view of the spring sleeve means shown in FIGURE 4.
Figure 4:
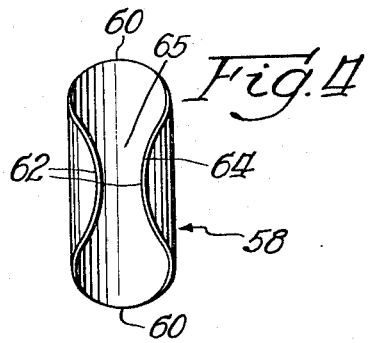
FIGURE 4 is an enlarged view of the spring sleeve means of the invention.

A pre-wind stop or limit in the form of a split sleeve 58 is disposed between the coils or helical portion 38 of the spring 36 and the mandrel parts or interengaging extensions 30 and 44 such that the sleeve is substantially enclosing the axial extent and outer peripheral portions of such shaft portions 30 and 44. The member 58, in the assembled condition in the retractor 10, is of flexible material such as spring steel and is generally cylindrical in shape and is provided with curved axial extending end sections 60, 60 and generally radially or trans-axially extending end sections 62, 62 and with a thin edge 64, the member 58 being rolled from flat circular shaped disc 66 as seen in FIGURE 5. As seen in FIGURE 4 the end sections 62, 62 are spaced apart from one another to define a gap 65 of the split annular member or sleeve 58.

The retractor 10 is placed in a pre-wound condition by rotating the barrel or reel 12 relative to the reaction member 18 allowing the spring 36 to become wound, the extent of winding being determined by the number of barrel revolutions relative to the reaction member 18. The retractor 10 is then placed on the belt length 4 whereby the belt length 4 forms an interwoven path about the reaction member 18, the barrel 12 and the clamp means 54. Upon release of the retractor 10 the spring 36 winds the belt length 4 about the barrel 12 in a superimposed double ply belt coil. This is disclosed in the U.S. co-pending patent application having Serial No. 335,028 and filed January 2, 1964 now Patent Number 3,230,009.

In winding the spring 36 during the prewind operation the spring 36 is reduced in cross-sectional diameter and the spring 36 extends or lengthens axially exerting an outward force on the end caps or plugs 26, 46 which upon further spring winding could, if it were not for the presence of sleeve 58, move outwardly of one another spreading the elastically bendable arms 20, 22 of reaction member 18 in opposite directions from one another and producing an opening or gap 70 between the shaft portions 30, 44 allowing some of the coil portion 38 of the spring to wedge extend down into the gap 70 and allow further reduction in the diameter of the spring coil portion 38. This would reduce the cross-sectional diameter of the spring 36 to such an extent that the spring 36 exceeds its yield limit and yields permanently so that the spring 36 can no longer wind or unwind. On further winding there is no spring resistance because the spring 36 is yielding at a reduced coil diameter and the spring 36 being excessively overwound the retractor 10 is no longer functionable. The upper half portion of FIGURE 6 illustrative of the condition where no sleeve 58 is provided and the coiled portion 38 is tightly wound against the mandrel parts 30, 44 and section 72 of the coil portion 38 has fallen into the gap 70 between the mandrel parts.

However, with the interpositioning of the sleeve or shim part 58 between the spring 36 and the shaft parts 30, 44 over the junction of the diameters of the end plugs or caps 26, 46, there is provided a solid stop for the spring 36. So as the spring 36 is wound decreasing in diameter and increasing in length any gap formed between the parts or drive connecting members 26, 46 is covered by the shim part 58 which itself is wound down and tightly held on the cylindrical mandrel portions 30, 44 of the end caps 26, 46, the internal diameter of the spring 36 being continuously supported as not to yield as in the case where no sleeve or shim 58 is provided. By using a curved or circular shaped sleeve 58 with a curved or arcuate edge 64 there are no sharp corners on the disc edge that can be torn or distorted by the peripheral surface portions 74 of the coil portion 38 of the spring 36 and regardless of how the sleeve or shim 58 is twisted it presents the same shape to the peripheral portions 74 of the spring 36.

Figure 2:
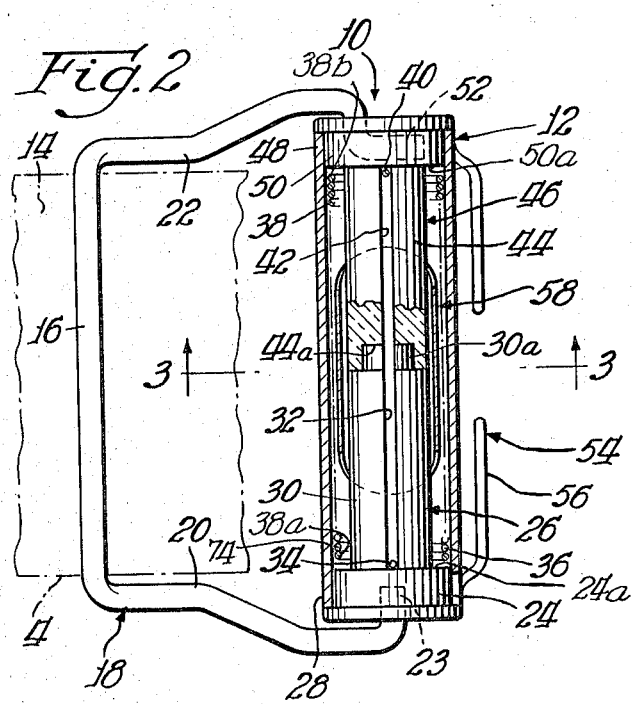
FIGURE 2 is an enlarged view partly in section of the seat belt retractor.
Figure 6:
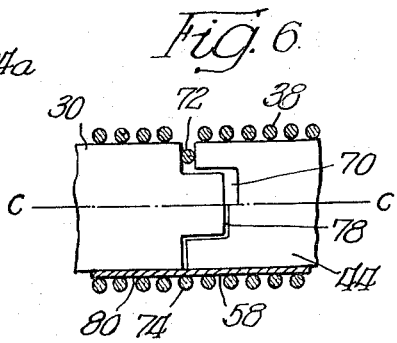
FIGURE 6 is an enlarged explanatory schematic view of my invention.
Figure 3:
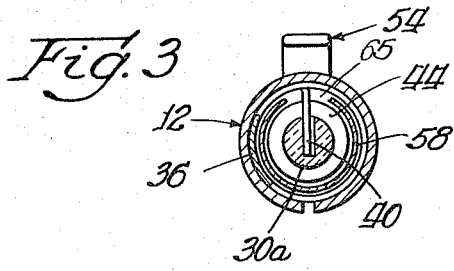
FIGURE 3 is a view taken along line 3—3 of FIGURE 2.

The lower half portion of the enlarged sectional explanatory view, FIGURE 6, which is separated from the upper portion of FIGURE 6 by center line C—C is illustrative of the condition where the sleeve 58 is interposed between the mandrel parts 30, 44 and the spring coil portion 38 as shown in FIGURE 2 and demonstrates that the coil section 76 is prevented from entering into space or gap 78 between the drive connecting mandrel or shaft parts 30, 44 by the bridging portion 80 of the sleeve 58. The lower half of the view illustrates also that the spring coil portion 38 is tightly wound around the sleeve 58 which is tightly wound around the mandrel parts 30, 44 to limit further outward axial movement and further rotation of the mandrel parts 30, 44 noting that the gap 78 being of smaller dimension than the gap 70 of the upper portion of FIGURE 6. The split sleeve is reduced in diameter by the tightening of the spring coil 38 thereabout, the reduction of the sleeve diameter being possible by the reduction of the sleeve gap 65.

The particular embodiment of the invention has been described and illustrated, it is apparent that modifications and alterations may be made thereon. It is therefore the intention in the appended claims to cover all subject modifications and alterations as may fall within the true spirit and scope of the invention.

What is claimed is:

1. In a rotary retractor device adapted to wind up and unwind an elongated member, said device including a reaction member, a reel for receiving said elongated member, means rotatably supporting said reel on said reaction member including a driver plug and an anchor plug rotatable relative to each other, each of said plugs including an axially extending mandrel like portion, and an elongated helical torsion spring having opposite ends thereof connected between said reel and said reaction member for rotatably driving said reel with respect to said reaction member, said spring being disposed about said mandrel like portions, defining an annular space therearound; the improvement comprising an elongated, generally cylindrical, resilient split sleeve disposed within said annular space adapted to engage a plurality of convolutions of said spring for guiding the winding movement thereof, said sleeve adapted to undergo gradual reduction in diameter responsive to engagement with the convolutions of said spring as said spring is wound up, said split sleeve being effective to clutch said mandrel portions together to resist relative movement thereof as said sleeve undergoes reduction in diameter prior to full prewind of said spring, said mandrel portions serving thereafter as a positive stop for limiting further diameter reduction of said sleeve to limit the winding of said spring to a predetermined maximum.

2. The invention according to claim 1 wherein said split sleeve is provided with curved edges engageable with the convolutions of said spring.

3. The invention according to claim 1 wherein said split sleeve is in the form of a cylinder rolled from a circular disc providing a continuously curved edge for engagement with the convolutions of said spring.

References Cited by the Examiner

UNITED STATES PATENTS

| | | |
|---|---|---|
| 1,716,285 | 6/1929 | Szako. |
| 2,725,097 | 11/1955 | Thoreson. |
| 2,814,504 | 11/1957 | Campbell et al. __ 242—107.1 X |
| 3,007,653 | 11/1961 | Becker _____ 242—107.5 |

STANLEY N. GILREATH, *Primary Examiner.*

FRANK J. COHEN, W. S. BURDEN,
*Assistant Examiners.*